United States Patent [19]

Fiocco et al.

[11] Patent Number: 5,728,320
[45] Date of Patent: Mar. 17, 1998

[54] CHEMICAL DISPERSANT FOR OIL SPILLS

[75] Inventors: Robert J. Fiocco, Summit, N.J.; Kenneth W. Becker, Houston, Tex.; Gerard P. Canevari, Cranford; Richard R. Lessard, Morristown, both of N.J.

[73] Assignee: Exxon Research & Engineering Company, Florham Park, N.J.

[21] Appl. No.: 798,253

[22] Filed: Feb. 11, 1997

Related U.S. Application Data

[63] Continuation-in-part of Ser. No. 263,974, Jun. 22, 1994, Pat. No. 5,618,468, which is a continuation-in-part of Ser. No. 990,963, Dec. 15, 1992, abandoned.

[51] Int. Cl.$^6$ .................. B01F 17/10; E02B 15/04
[52] U.S. Cl. ............. 252/312; 252/354; 210/749; 210/693; 210/925; 510/365
[58] Field of Search ............. 252/312, 354; 210/749, 925, 693; 510/365, 477, 488

[56] References Cited

U.S. PATENT DOCUMENTS

| | | | |
|---|---|---|---|
| 3,793,218 | 2/1974 | Canevari | 252/312 |
| 3,959,134 | 5/1976 | Canevari | 210/59 |
| 3,998,733 | 12/1976 | Blanchard et al. | 210/59 |
| 4,110,213 | 8/1978 | Tennant et al. | 252/312 |
| 4,469,603 | 9/1984 | Lepain et al. | 210/749 |
| 4,502,962 | 3/1985 | Becker et al. | 210/749 |
| 4,560,482 | 12/1985 | Canevari | 210/749 |
| 4,597,893 | 7/1986 | Byford et al. | 252/354 |
| 4,764,285 | 8/1988 | Robbins et al. | 210/749 |
| 4,830,759 | 5/1989 | Charlier | 210/749 |
| 5,035,826 | 7/1991 | Durbut et al. | 510/365 |
| 5,051,192 | 9/1991 | Charlier | 210/749 |
| 5,430,097 | 7/1995 | Petroff et al. | 524/755 |
| 5,618,468 | 4/1997 | Canevari et al. | 252/354 |

FOREIGN PATENT DOCUMENTS 0 155 208 A  9/1985  European Pat. Off.

OTHER PUBLICATIONS

Translation of EP 0 155 208, PTO-95-6015, Sep. 1995.

*Primary Examiner*—Richard D. Lovering
*Assistant Examiner*—Daniel S. Metzmaier
*Attorney, Agent, or Firm*—James H. Takemoto

[57] ABSTRACT

An improved dispersant formulation for dispersing oil which contains a mixture of a sorbitan monoester of an aliphatic monocarboxylic acid, a polyoxyethylene adduct of a sorbitan monoester of an aliphatic monocarboxylic acid, an alkali metal salt of a dialkyl sulfosuccinate, a polyoxyethylene adduct of a sorbitan triester or a sorbitol hexaester of an aliphatic monocarboxylic acid and a solvent comprising at least one of a propylene glycol ether, ethylene glycol ether, water, alcohol, glycol, and a paraffinic hydrocarbon.

9 Claims, No Drawings

CHEMICAL DISPERSANT FOR OIL SPILLS

BACKGROUND OF THE INVENTION

This patent application is a continuation-in-part of U.S. Ser. No. 263,974 filed Jun. 22, 1994, now U.S. Pat. No. 5,618,468 which is a continuation-in-part of U.S. Ser. No. 990,963 filed Dec. 15, 1992, abandoned.

1. Field of the Invention

This invention relates to an oil dispersant formulation and a process for dispersing spilled oil on water. More particularly, a formulation of chemical surfactants and solvent results in a low toxicity dispersant which is effective at dispersing highly viscous oil at low concentrations under a wide range of weather conditions.

2. Description of the Related Art

One of the technologies used for oil spill response involves the use of chemical dispersants. The application of chemical dispersants is dependent on several factors: (1) weather conditions, (2) nature of the oil spilled, (3) area to be covered and (4) adequacy of equipment and supplies. Although it is highly desirable, it has not been possible to provide a single chemical dispersant formulation which will treat all oils under all conditions. For example, it is much more difficult to disperse a high-boiling viscous oil such a bunker oil as compared to a light crude oil. Furthermore crude oils and oil products vary widely in their properties including ability to be dispersed.

A desirable property for chemical dispersants used to treat oil spills is that the surfactant formulation of the dispersant results in very low oil-water interfacial tension such that the oil s effectively dispersed as fine oil droplets in water without coalescing even at low dispersant to oil ratios. Also, the dispersant formulation should be of minimal toxicity so that it does not add to the environmental damage caused by the oil spill.

Various dispersant formulations have been advanced for treating oil spills. U.S. Pat. No. 3,793,218 discloses a dispersant formulation for dispersing oil slicks. U.S. Pat. No. 4,560,482 relates to a dispersant composition for treating oils having viscosities of from 1000 to 10,000 cp in water.

SUMMARY OF THE INVENTION

The present invention provides an improved dispersant formulation which is effective on highly viscous hydrocarbons and a improved process for dispersing an oil layer on water.

The improved dispersant formulation comprises:

(a) a sorbitan monoester of a $C_{10}$–$C_{20}$ aliphatic monocarboxylic acid, (b) a polyoxyethylene adduct of a sorbitan monoester of a $C_{10}$–$C_{20}$ aliphatic monocarboxylic acid, said adduct having from 6 to 30 ethyleneoxide units per mole of ester, (c) an alkali metal salt of a dialkyl sulfosuccinate wherein the alkyl group is a branched chain radical containing 4 to 13 carbon atoms, (d) a polyoxyethylene adduct of a sorbitan triester of a $C_{10}$–$C_{20}$ aliphatic monocarboxylic acid having from 6 to 30 ethyleneoxide units per mole of triester or a polyoxyethylene adduct of a sorbitol hexaester of $C_{10}$–$C_{2}$- aliphatic monocarboxylic acid, said having from 6 to 30 ethyleneoxide units per mole of hexaester, and (e) a propylene glycol ether solvent selected from the group consisting of propylene glycol n-butyl ether and tripropylene glycol n-butyl ether.

In another embodiment, the improved dispersant formulation comprises:

(a) a sorbitan monoester of a $C_{10}$–$C_{20}$ aliphatic monocarboxylic acid, (b) a polyoxyethylene adduct of a sorbitan monoester of a $C_{10}$–$C_{20}$ aliphatic monocarboxylic acid, said adduct having from 6 to 30 ethyleneoxide units per mole of ester, (c) an alkali metal salt of a dialkyl sulfosuccinate wherein the alkyl group is a branched chain radical containing 4 to 13 carbon atoms provided that the critical micelle concentration at 25° C. is greater than 0.05 g/100 ml.

(d) a polyoxyethylene adduct of a sorbitan triester of a $C_{10}$–$C_{20}$ aliphatic monocarboxylic acid having from 6 to 30 ethyleneoxide units per mole of triester or a polyoxyethylene adduct of a sorbitol hexaester of $C_{10}$–$C_{2}$- aliphatic monocarboxylic acid, said having from 6 to 30 ethyleneoxide units per mole of hexaester, and (e) a solvent comprising at least one of a propylene glycol ether, ethylene glycol ether, water, alcohol, glycol and a paraffinic hydrocarbon.

The improved process for dispersing an oil layer on water comprises contacting the oil layer on the water surface with the dispersant formulations described above.

DESCRIPTION OF THE PREFERRED EMBODIMENTS

In the sorbitan esters of $C_{10}$–$C_{20}$ aliphatic monocarboxylic acids (component (a)), the aliphatic radical is straight or branched chain and saturated or unsaturated. Preferred aliphatic monocarboxylic acids moieties are $C_{12}$–$C_{18}$ straight chain saturated or monoethylenically unsaturated. Sorbitan esters are prepared by dehydrating sorbitol followed by reaction with aliphatic monocarboxylic acid, and are available commercially from ICI under the trade name Span®.

Polyoxyethylene adducts of sorbitan monoesters of $C_{10}$–$C_{20}$ aliphatic monocarboxylic acids (component (b)) have from 6 to 30, preferably 15 to 22, ethyleneoxide units per mole of ester. Such polyoxyethylene adducts are prepared by reacting the sorbitan esters of aliphatic monocarboxylic acids described above with 1,2-ethylene oxide. These polyoxyethylene adducts are available commercially from ICI Inc. under the trade name Tween®.

The alkali metal salt of a dialkyl sulfosuccinate wherein the alkyl group is a $C_4$–$C_{13}$ branched chain radical (component (c)) is an anionic surfactant. A preferred salt is sodium dioctyl sulfosuccinate commercially available from Mona Industries, Inc. under the trade name Monowet®. The critical micelle concentration for any given dialkyl sulfosuccinate is primarily a function of nature of the alkyl group on the sulfosuccinate. In the present dispersant formulation, the dialkyl sulfosuccinate surfactant has a critical micelle concentration at 25° C. of at least about 0.05 g/100 ml.

Polyoxyethylene adducts of sorbitan triesters or sorbitol hexaesters of $C_{10}$–$C_{20}$ aliphatic monocarboxylic acids (component (d)) contain from 6 to 30, preferably 15 to 22 ethyleneoxide units per mole of triester or hexaester. The sorbitol adduct is prepared by reacting ethylene oxide with sorbitol followed by esterification and are commercially available from ICI. Inc The propylene or ethylene glycol ethers used as solvents in the present invention (component (e)) have a maximum solubility in water of 25 ml per 100 ml water at 25° C., preferably 10 ml per 100 ml water. Preferred solvents are dipropylene glycol n-butyl ether, propylene glycol n-butyl ether, tripropylene glycol n-butyl ether, propylene glycol phenyl ether and ethylene glycol phenyl ether, more preferably propylene glycol n-butyl ether, dipropylene glycol n-butyl ether, and tripropylene glycol n-butyl ether, especially dipropylene glycol n-butyl ether. Glycol ethers are available commercially from Dow Chemical Co. under the trade name Dowanol®. Propylene and ethylene glycol monoethers possess favorable lipophilic properties for use in oil dispersant formulations and are also of low toxicity. From a toxicological standpoint, ethers which do not contain an aromatic moiety are preferred.

When the propylene or ethylene glycol ether solvents are combined with a paraffinic solvent, the solubility of the glycol ether solvents is of lesser importance, especially where the paraffinic solvent is the major component of the solvent package. It is feasible to use the propylene glycol ether or ethylene glycol ether with water, alcohol or glycol. It is also feasible to use only water, alcohol or glycol with paraffinic solvent. The nature of the alcohol or glycol is not critical. Preferred alcohols are $C_2$ to $C_{13}$ alcohols and preferred glycols are $C_2$ to $C_8$ glycols. Preferred paraffinic solvents are isoparaffinic solvents. Especially preferred are isoparaffinic solvents containing at least about 50 vol. % of isoparaffins. Such isoparaffinic solvents are available from Exxon Company, USA under the trade name ISOPAR®. The total amount of solvent is from 15 to 90 vol. %, based on dispersant formulation, preferably from 30 to 80 vol. %. The amount of paraffinic solvent is from about 30 to 100 vol. %, based on total solvent, preferably from 60–98 vol. %. Preferred solvent combinations include isoparaffinic solvent combined with ethylene glycol n-butyl ether, propylene glycol n-butyl ether, dipropylene glycol n-butyl ether and tripropylene glycol n-butyl ether, tripropylene glycol methyl ether, propylene glycol phenyl ether and propylene glycol n-propyl ether. Especially preferred solvent combinations include isoparaffinic solvent combined with dipropylene glycol n-butyl ether. While not wishing to be bound to any theory, it is believed that when any given solvent set forth above, e.g., glycol ether, water, alcohol or glycol, is combined with paraffinic solvent, especially isoparaffinc solvent, the nature of the given solvent is not as important as when the given solvent is the sole solvent (without added paraffinic solvent). When combined with isoparaffinic solvent, the role of the given solvent relates to the solubility and hence stability of the surfactant package as well as impacting performance of the dispersant formulation in terms of its dispersant effectiveness. In some applications, it may be feasible to use a paraffinic hydrocarbon as the sole solvent component, especially when the paraffinic solvent is an isoparaffin. A preferred isoparaffinic solvent is one containing at least 50 wt. % isoparaffins.

The concentration ranges for components (a) through (e) in the dispersant formulation are as follows: (a) 1–9 vol. %; (b) 2–17 vol. %; (c) 5–34 vol. %; (d) 2–25 vol. %; and (e) 90–15 vol. %, based on dispersant formulation. Where component (e) is a combination of solvents, the total solvent remains at 90–15 vol. %, preferably 30 to 80 vol. %.

The present dispersant formulations containing propylene or ethylene glycol ethers have the advantage of dispersing highly viscous hydrocarbons, i.e., hydrocarbons having a viscosity greater than 10,000 cp at 15° C. Such viscous hydrocarbons such as heavy crudes, weathered crudes and bunker oil are difficult to disperse because of the cohesiveness of the oil which resists the spreading and breakup of the oil as well as the penetration mixing of the dispersant formulation. In addition these formulations have low environmental impacts and can be sprayed over wide temperature ranges. Viscosity properties are favorable to aerial spraying over a wide temperature range, and evaporation losses are minimal which means that nearly all the solvent will reach the oil slick to aid surfactant penetration of the oil. It is preferred that the viscosities for the dispersant formulations be greater than about 70 cp at 68° F. Oil slick dispersal can be achieved by spraying the dispersant formulation directly on the slick through one or more spray nozzles. Dispersal action can be achieved under normal water motion, i.e., in a presence of wave action.

An important property of a dispersant formulation for use on oil spills is the ability to disperse the maximum amount of oil per unit of dispersant. The ability to effectively disperse oil at low dispersant to oil ratios (DOR) provides both economic and environmental benefit. By lowering the amount of dispersant per unit of oil, there is less need for resupplying the application system thereby saving time. The present formulations are effective at low dispersant to oil ratios.

The improved dispersant formulations are further illustrated by the following examples, which include a preferred embodiment of the invention.

EXAMPLE 1

Dispersant Effectiveness

This example is directed to dispersant effectiveness on various crude oil samples and No. 6 fuel oil. A dispersant formulation B was prepared by mixing 6.4 vol. % of sorbitan monooleate, 11.7 vol. % ethoxylated (20) sorbitan monooleate, 25.0 vol. % sodium dioctyl sulfosuccinate, 18.1 vol. % of ethoxylated (20) sorbitan trioleate and 38.8 vol. % of dipropylene glycol n-butyl ether as solvent. Dispersant formulation A is the same as formulation B except that A contains ethylene glycol n-butyl ether as solvent. Ethylene glycol n-butyl ether is a solvent employed in a commercially available dispersant formulation. Dispersant formulation C is the same as formulation B except that C contains propylene glycol n-butyl ether as solvent.

The IFP dilution test is a well-known laboratory procedure to measure dispersant effectiveness. The physical apparatus for the test involves a cylindrical glass container for holding a test solution and an oscillating hoop that fits inside the container. The glass container has two ports: (1) an inlet port located just below the experimental water level and (2) an outlet port that is located near the bottom of the vessel and contains an overflow arm extending upward to determine the depth of the test solution in the container. Clean seawater is introduced by a peristaltic pump into the glass container through the inlet port. Overflow water (containing oil droplets) leaves the container through the exit port and is collected in a flask. The oscillating hoop is suspended 20–35 mm beneath the water's surface and moves up and down with a 15 mm vertical path by an electromagnet controlled by an electronic timer. The frequency of the oscillation can be varied in the range of 6.66–20 cycles/minute. For tests designed to evaluate dispersant effectiveness, the following experimental protocol is followed: the glass container is filled with sea water, a specified amount of oil is poured onto the water surface inside a 10 cm diameter vertical ring, dispersant is added onto the surface of the oil, the oscillating hoop is started, and water flow through the peristaltic pump is started at a specified flow rate (e.g., to produce a dilution or turnover rate of 0.5/hour). Outflow water is collected for specified periods of time (e.g., 0–30 minutes, 30–60 minutes, and 60–120 minutes) and analyzed for oil content. Oil content in the collected samples follows the equation (1):

$$x = x_o e^{-Dt} \qquad (1)$$

where x = oil concentration at time t, $x_o$ = initial dispersed oil concentration in the experimental beaker, and D = dilution rate.

The percentage of washed-out oil (P) at time t is:

$$P = 100(1 - x/x_o) = 100(1 - e^{-Dt}). \qquad (2)$$

Dispersion effectiveness can be determined from the equation:

$$E = 100[(P_d - P_c)/P_c] \qquad (3)$$

where

E = dispersant effectiveness (%), $P_d$ = percentage of washed-out oil at time t in solution with dispersant d, and $P_c$ = percentage of washed-out oil at time t in control solution without dispersant.

The results are shown in Table 1.

TABLE 1

| CRUDE OIL SAMPLE* | | DISPERSANT EFFECTIVENESS (%) DISPERSANT | | |
|---|---|---|---|---|
| | | A | B | C |
| STATFJORD | 200+*** | 54 | 54 | 70 |
| STATFJORD | 200+ (DOR 1:50) | 38 | 61 | — |
| STATFJORD | 200+ (DOR 1:100) | 14 | 32 | — |
| BALDER | 200+ | 70 | 82 | 78 |
| BALDER | 200+ (DOR 1:50) | 45 | 66 | — |
| BALDER | 200+ (DOR 1:100) | 27 | 44 | — |
| #6 FUEL OIL | (13,800 CP) | <1 | 39 | 30 |
| BCF | 250+ (20,500 CP) | 15 | 59 | 35 |
| OSEBERG | 200+/50% W/O** | 71 | 75 | 76 |
| BALDER | 200+/50% W/O | 54 | 63 | 57 |

*DOR is 1:25 unless noted; all direct addition; temperature 13° C.; sea water
**W/O = Water in oil emulsion containing 50% sea water.
***200+ is that fraction of oil boiling above 200° C.

In comparing dispersant A with dispersant B which is the improved formulation according to this invention, it can be seen that at a given DOR, absolute effectiveness can vary widely depending on the oil sample. However, at lower DOR ratios, e.g. 1:50 and 1:100, dispersant B is generally more effective demonstrating superior dispersal at lower surfactant concentrations. Moreover, highly viscous samples such as #6 fuel oil and BCF show marked improvement by dispersant B in comparison to dispersant A. Likewise, dispersant C shows a marked improvement over dispersant A. This demonstrates the favorable properties of the present formulation containing a propylene glycol ether over a comparable formulation containing an ethylene glycol ether.

EXAMPLE 2

Wave Basin Tests of Dispersant Effectiveness

This example demonstrates that the dispersant formulation of this invention can be effectively applied either neat or in a water diluted form.

The wave basin is considered to be a realistic simulation of sea conditions and comprises a concrete pool which varies in depth from 3.3 to 1.85 m. The shallow end contains a pebble beach to absorb wave energy. The wave generator is situated at the deep end of the pool and consists of four hydraulically driven wave boards spanning the pool width. The hydraulic system can be controlled to generate the desired wave pattern. A closed containment boom (approximately rectangular in shape) is located within the pool. The boom is held in place by guy ropes. A small submerged stanchion is located inside the boom to create a small active "breaking wave" zone. A second smaller closed containment boom of similar shape is located within the first containment boom. Oil was placed in the inner containment boom and dispersant formulation B was applied to the oil by spray boom or hand spray. Wave action was initiated and the inner boom opened after 10 minutes. After two hours the area within the outer boom was skimmed to recover oil. The results are shown in Table 2.

TABLE 2

| TEST NO.[1] | DISPERSANT-B CONC. | APPLICATION METHOD | NOMINAL TREAT (DOR)[2] | UNRETAINED OIL[3] | INTERFACIAL TENSION (DYNES/CM) | |
|---|---|---|---|---|---|---|
| | | | | | START | END |
| 1 | Blank | None | — | 39% | 15 | 10 |
| 9 | Blank | None | — | 41% | 11 | 6 |
| 10 | Neat | Spray Boom | 1:20 | 93%[4] | 13 | <1 |
| 11 | 10%[5] | Hand Spray | 1:20 | 99% | 13 | <1 |
| 13 | Neat | Hand Spray | 1:40 | 94% | 13 | <1 |

NOTES:
[1]40 Liters So. La. Sunset Pipeline Crude (37° API) applied in inner boom (6 m × 10 m). Outer boom 10 m × 14 m. 17 cm waves with artificial reef breaking wave. Water temperature 18–20° C.; Salinity 31 ppt.

TABLE 2-continued

| TEST NO.[1] | DISPERSANT-B CONC. | APPLICATION METHOD | NOMINAL TREAT (DOR)[2] | UNRETAINED OIL[3] | INTERFACIAL TENSION (DYNES/CM) START | END |
|---|---|---|---|---|---|---|

[1]Dispersant applied to entire inner boom area, except Test 13 applied to oil area only.
[2]Inner boom opened 10 minutes after waves started. Oil recovered within outer boom after 2 hours by disc skimmer. Estimate approximately 17% oil evaporated during test.
[3]Unfavorable wind conditions prevented a significant amount of oil from reaching the active "breaking wave" zone. After 1 hour, oil in dead zone was gently pushed to active zone.
[5]Dispersant mixed with salt water to 10% concentration prior to application.

These results show that from 93% to 99% of the test crude oil was dispersed (unretained) from the boomed test area after two hours demonstrating effective dispersal under wave conditions. The reduced interfacial tension of the remaining oil on the water within the boom shows that the treatment is more than adequate and that this oil would also be easily dispersed if suitably subjected to the wave action.

EXAMPLE 3

The solubility properties of commercially available glycol ethers are shown in Table 3.

TABLE 3

| Chemical Name* | Solubility in Water (ml/100 ml) |
|---|---|
| Propylene Glycol Methyl Ether | ∞ |
| Dipropylene Glycol Methyl Ether | ∞ |
| Tripropylene Glycol Methyl Ether | ∞ |
| Propylene Glycol n-Butyl Ether | 7.3 |
| Dipropylene Glycol n-Butyl Ether | 5.5 |
| Tripropylene glycol n-Butyl Ether | 3.0 |
| Propylene Glycol n-Propyl Ether | ∞ |
| Dipropylene Glycol n-Propyl Ether | 19 |
| Propylene Glycol Phenyl Ether | 1.1 |
| Ethylene Glycol n-Butyl Ether | ∞ |
| Diethylene Glycol n-Butyl Ether | ∞ |
| Diethylene Glycol Methyl Ether | ∞ |
| Ethylene Glycol Phenyl Ether | 2.3 |

*Commercially available from Dow Chemical Company under the trade name Dowanol ®.

As shown in Table 3, many of the commercially available glycol ethers are totally miscible with water based on their solubility properties. When such totally miscible glycol ethers are used in dispersant formulations as solvents, the solvent rapidly diffuses into the aqueous phase when applied to an oil spill thus reducing the effectiveness of distributing the surfactants throughout the oil phase.

Some water solubility is desirable to optimize stability of dispersant formulation in storage and for certain applications where dilution in aqueous medium is desirable, for example, spraying from a pressurized water delivery system. If additional viscosity control is desired, the glycol ether solvent may be mixed with a hydrocarbon solvent. Such a mixture can also have an added advantage of improving the distribution of the surfactants in the oil phase.

EXAMPLE 4

This example is directed to other advantages of using a combination of isoparaffinic solvent and co-solvent. A dispersant formulation containing 15.2 vol. % polyoxyethylene (20) sorbitan trioleate, 9.8 vol. % of polyoxyethylene(20) sorbitan monooleate, 5.4 vol. % sorbitan monooleate, and 19.6 vol. % of sodium dioctyl sulfosuccinate was prepared. The balance (50%) of the dispersant formulation is solvent. The dispersant effectiveness was measured using the IFP technique described in Example 1. The results for a No. 6 bunker oil (200° C.+fraction, viscosity about 37,000 cP @10 s$^{-1}$) are shown in Table 4.

TABLE 4

| Solvent[1] | % Dispersed |
|---|---|
| Isopar M (formulation hazy) | 84.6 |
| Exxsol D80[2] | 57.9 |
| Ethylene glycol n-butyl ether | 46.1 |
| Propylene glycol n-butyl ether | 72.0 |
| Dipropylene glycol n-butyl ether | 74.4 |
| Tripropylene glycol n-butyl ether | 71.5 |
| Propylene glycol n-propyl ether | 33.6 |
| Dipropylene glycol n-propyl ether | 59.6 |
| Dipropylene glycol methyl ether | 49.3 |
| Tripropylene glycol methyl ether | 61.5 |
| Ethylene glycol phenyl ether | 60.3 |
| Propylene glycol phenyl ether | 71.8 |
| Isopar M (45 vol. %)/Dipropylene glycol n-butyl ether (5 vol. %) | 87.0 |
| Isopar M (40 vol. %)/Dipropylene glycol n-butyl ether (10 vol. %) | 80.0 |
| Isopar M (25 vol. %)/Dipropylene glycol n-butyl ether (25 vol. %) | 77.0 |
| Exxsol D80 (25 vol. %)/Dipropylene glycol n-butyl ether (25 vol. %) | 51.9 |
| Isopar M (25 vol. %)/Exxsol D80 (25 vol %) | 77.0 |
| Isopar M (25 vol. %)/Tripropylene glycol methyl ether (25 vol. %) | 85.1 |
| Isopar M (40 vol. %)/Ethylene glycol n-butyl ether (10 vol. %) | 72.7 |
| Isopar M (47.5 vol. %)/Ethylene glycol phenyl ether (2.5 vo.. %) | 78.6 |
| Isopar M (47.5 vol. %)/Propylene glycol phenyl ether (2.5 vol. %) | 87.8 |
| Isopar M (47.5 vol. %)/Propylene glycol n-propyl ether (2.5 vol. %) | 89.9 |
| Isopar M (45 vol. %)/Propylene glycol n-propyl ether (5 vol. %) | 52.3 |
| Isopar M (47.5 vol. %)/Water (2.5 vol. %) | 75.5 |

[1]Dispersant formulation in 50 vol. % solvent.
[2]Contains less than 50 vol. % isoparaffins As shown in Table 4, when a single solvent is used, propylene glycol n-butyl ether, dipropylene glycol n-butyl ether, tripropylene glycol n-butyl ether, propylene glycol phenyl ether, and Isopar M give the best performance with regard to % dispersed. However, the propylene glycol phenyl ether solvent may not be desirable for an oil spill dispersant because of the aromatic moiety. Isopar M may not be desirable because of the haze, but still could be used in those cases where haze is acceptable.

Solvent mixtures of glycol ether and Isopar are generally more effective than would be expected from either solvent alone. This indicates a synergistic effect of the solvent mixture. Furthermore, lowering the concentration of glycol ether in the solvent mixture relative to the Isopar component favors increased dispersal effectiveness. The amount of glycol ether in the mixture must generally be above about 2 vol. % in order to keep the surfactant package in solution. For solvent mixtures in which Isopar is a major component, the solubility of the glycol ether in water becomes less of a factor. In fact, tripropylene glycol methyl ether which is fully miscible with water (see Table. 3) is a very effective dispersing agent when mixed with Isopar. The amount of co-solvent is that sufficient to solubilize the surfactant package, i.e., that amount effective to clear up any haze in the final formulation without causing haziness or phase separation.

Other solvents besides glycol ethers can also be used to keep the surfactant package in solution, including alcohols, glycols and water. The amount of such solvents is that effective to clear up any haze in the final formulation. If the amount of co-solvent is too great, then the final surfactant formulation may again become hazy due to solubility problems with the surfactant package. The combination of Isopar M with co-solvent is more effective than the pure solvent alone (without Isopar). As noted above, the combination of solvents exhibits a synergisim in many cases, i.e., the dispersant effectiveness is greater than one would expect from a mere combination of Isopar M with co-solvent. Even solvents which are soluble in water can be effective dispersants when mixed with Isopar M in small amounts. Furthermore, at low co-solvent concentrations, toxicological concerns over glycol ethers containing an aromatic moiety are much less.

What is claimed is:

1. An improved dispersant formulation effective on highly viscous hydrocarbons which comprises:

(a) a sorbitan monoester of a $C_{10}$–$C_{20}$ aliphatic monocarboxylic acid, (b) a polyoxyethylene adduct of a sorbitan monoester of a $C_{10}$–$C_{20}$ aliphatic monocarboxylic acid, said adduct having from 6 to 30 ethyleneoxide units per mole of ester, (c) an alkali metal salt of a dialkyl sulfosuccinate wherein the alkyl group is a branched chain radical containing 4 to 13 carbon atoms, (d) a polyoxyethylene adduct of a sorbitan triester of a $C_{10}$–$C_{20}$ aliphatic monocarboxylic acid having from 6 to 30 ethyleneoxide units per mole of triester or a polyoxyethylene adduct of a sorbitol hexaester of $C_{10}$–$C_{20}$ aliphatic monocarboxylic acid, said having from 6 to 30 ethyleneoxide units per mole of hexaester, and (e) a propylene glycol ether solvent selected from the group consisting of propylene glycol n-butyl ether and tripropylene glycol n-butyl ether.

2. The formulation of claim 1 wherein the amounts of components (a) to (e) are: (a) 1–9 vol. %, (b) 2–17 vol. %, (c) 5–34 vol. %, (d) 2–25 vol. % and (e) 90–15 vol. %.

3. The formulation of claim 1 wherein component (b) is a polyoxyethylene adduct of a sorbitan monoester of a $C_{10}$–$C_{20}$ aliphatic monocarboxylic acid.

4. The formulation of claim 1 wherein component (d) is a polyoxyethylene adduct of a sorbitan triester of a $C_{10}$–$C_{20}$ aliphatic monocarboxylic acid.

5. The formulation of claim 1 wherein the solvent is a mixture of glycol ether and paraffinic hydrocarbon.

6. The formulation of claim 1 wherein component (d) is the polyoxyethylene adduct of a sorbitol hexaester of a $C_{10}$–$C_{20}$ aliphatic monocarboxylic acid.

7. The formulation of claim 5 wherein the hydrocarbon is an isoparaffinic hydrocarbon.

8. A method for dispersing an oil layer on water which comprises contacting the layer with the dispersant formulation of claim 1.

9. The method of claim 8 wherein the dispersant formulation is applied to the oil layer by aerial spraying or from a boat.

* * * * *